(12) United States Patent
Tsui

(10) Patent No.: US 8,431,024 B1
(45) Date of Patent: Apr. 30, 2013

(54) METHOD FOR ENHANCING BIOTRANSFORMATION OF GROUNDWATER CONTAMINANTS

(75) Inventor: Lo Tsui, New Taipei (TW)

(73) Assignee: Ming Chi University of Technology, New Taipei (TW)

( * ) Notice: Subject to any disclaimer, the term of this patent is extended or adjusted under 35 U.S.C. 154(b) by 0 days.

(21) Appl. No.: 13/493,633

(22) Filed: Jun. 11, 2012

(51) Int. Cl.
  *C02F 3/00* (2006.01)
(52) U.S. Cl.
  USPC ........... 210/610; 210/611; 210/622; 210/621; 210/747.8; 435/262.5
(58) Field of Classification Search ............... 435/262.5; 210/610–611, 620–622, 747, 747.8
  See application file for complete search history.

(56) References Cited

U.S. PATENT DOCUMENTS

| | | | | |
|---|---|---|---|---|
| 6,165,356 | A | * | 12/2000 | Carman et al. ................ 210/150 |
| 2002/0061584 | A1 | * | 5/2002 | Farone et al. .............. 435/262.5 |
| 2010/0227381 | A1 | * | 9/2010 | Hoag et al. ................. 435/262.5 |

* cited by examiner

*Primary Examiner* — Chester Barry
(74) *Attorney, Agent, or Firm* — Muncy, Geissler, Olds & Lowe, PLLC

(57) ABSTRACT

A method for enhancing biotransformation of groundwater contaminants is provided. The method comprises steps of providing an injection column at an upstream of a contaminated source for injecting a compost solid; providing a recirculation device at a downstream of the contaminated source; forming a compost liquid by mixing surface water or groundwater from the recirculation device with the compost solid, and the groundwater bringing the compost liquid to the contaminated source at the downstream; and producing a reaction at the contaminated source and the downstream. Also, the groundwater contaminants can be adsorbed and biodegraded in the injection column at the upstream by the recirculation of the recirculation device.

10 Claims, 8 Drawing Sheets

METHOD FOR ENHANCING BIOTRANSFORMATION OF GROUNDWATER CONTAMINANTS

BACKGROUND OF THE INVENTION

1. Field of the Invention

This invention generally relates to a method for enhancing biotransformation of groundwater contaminants, and in particular to a method for enhancing biotransformation of chlorinate organic compounds in groundwater.

2. Description of the Related Art

In order to enhance biotransformation of groundwater contaminants, it used to provide additional nutrient sources, electron donors, pH buffer solvents and the likes into groundwater through circulation wells to increase the in-situ degradation of groundwater contaminants by metabolic activity of microorganisms. Also, in order to enhance the contaminants desorbing from soil, surfactants are added to increase the solubility of the contaminants in groundwater.

The chlorinated aliphatic hydrocarbons have properties including high oil solubility, low flammability, low explosibility, high density vapor, chemical stability, low boiling point and high vapor pressure so that it is widely used in variety of industrial fields. However, left and untreated chlorinated aliphatic hydrocarbons waste are some of the most common and potentially hazardous soil and ground water contaminants. For example, chlorinated aliphatic hydrocarbons such as perchloroethylene (PCE) may form dense non-aqueous phase liquid (DNAPL) in groundwater because it is denser than water and it has high viscosity that may cause it is hard to remove from groundwater.

Some methods for treatment of groundwater contaminants involve physic methods such as sucking, purging and adsorption. However, these methods can not effectively and completely remove the contaminants above an impervious zone because of the uncertain scope of contaminated sources. Moreover, these methods only pump out but not treat the contaminants. Chemical oxidation may use oxidants for oxidizing the chlorinated aliphatic hydrocarbons. Due to the non-selective characteristics of oxidants, the oxidants commonly oxidize natural soil oxidizable matters prior to the chlorinated aliphatic hydrocarbons. Accordingly, the economic efficiency of the chemical oxidation is low. Currently, biotransformation of groundwater contaminants using microorganisms has become a favorable alternative for treating groundwater contaminants.

From a viewpoint of chemical reaction, PCE is liable to receive electrons but not release electrons, since it is a substance with highly oxidized state. Therefore, the biodegradation of PCE has a priority step of reductive dechlorination. Currently, some commercial biological agents have been employed to increase the transformation of PCE. However, the commercial biological agents are expensive. There is a need to seek an additive as cheap surfactant and an electron donor to increase the solubility and biodegradation of PCE in groundwater.

Therefore, the inventor conducted researches according to the scientific approach in order to improve and resolve the above drawback, and finally proposed the present invention, which is reasonable and effective.

SUMMARY OF THE INVENTION

It is an object of this invention to provide a method for enhancing biotransformation of groundwater contaminants. The method can enhance the solubility and biodegradation of groundwater contaminants in an aquifer zone by using compost liquid as a suitable surfactant and electron donors.

It is another object of this invention to provide a method for enhancing biotransformation of groundwater contaminants. The method may use a recirculation device reflowing the groundwater comprising groundwater contaminants at the downstream of the contaminated source to contact a compost solid for adsorbing and biodegrading the groundwater contaminants.

The object described above is achieved by a method for enhancing biotransformation of groundwater contaminants of the invention. The method comprises steps of providing an injection column at an upstream of a contaminated source; injecting a compost solid into the injection column contacting a liquid with the compost solid to form a compost liquid and a flow of groundwater bringing the compost liquid to an downstream of the contaminated source and the groundwater contaminants flowing to the downstream of the contaminated source; treating the groundwater contaminants at the downstream of the contaminated source. In addition, the method may reflow the groundwater at the downstream of the contaminated source into the injection column through a pump by a recirculation device to render the compost solid adsorbing and biodegrading the groundwater contaminants.

In an aspect of the invention, the compost solid may be provided underground, for example, injecting into an injection column, surface water is added from outside to the injection column or the groundwater reflows to the injection column by the recirculation device to contact the compost solid to form a compost liquid and a flow of groundwater brings the compost liquid and the groundwater contaminants of the contaminated source to an downstream of the contaminated source.

In an aspect of the invention, the compost solid may be provided above the ground surface, surface water is added from outside to the injection column or the groundwater reflows to the injection column by the recirculation device to contact the compost solid to form a compost liquid and a flow of groundwater brings the compost liquid and the groundwater contaminants of the contaminated source to an downstream of the contaminated source.

Compared with the conventional method, the invention can enhance adsorption and biodegradation of groundwater contaminants by using compost liquid as a suitable surfactant and electron donor. Also, the method according to the invention may reflow the groundwater at the downstream of the contaminated source into the injection column through a pump by a recirculation device to render the compost solid adsorbing and biodegrading the groundwater contaminants.

DETAILED DESCRIPTION OF THE INVENTION

The technical content of invention will be explained in more detail below with reference to a few figures. However, the figures are intended solely for illustration and not to limit the inventive concept.

Figure 1:
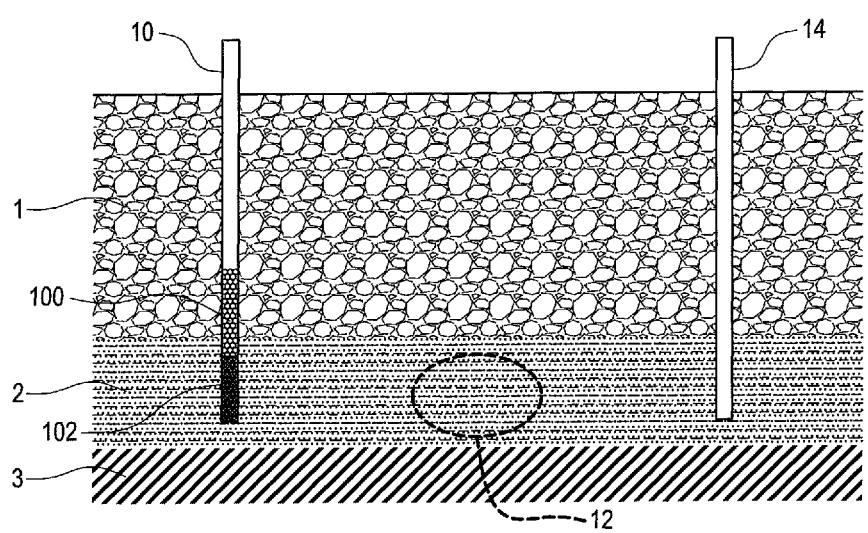
FIG. 1 shows a vertical cross section of the contaminated site used in a preferred embodiment of the invention.

FIG. 1 shows a vertical cross section of the contaminated site used in a preferred embodiment of the invention. As shown in FIG. 1, there are a unsaturated zone 1, a saturated zone 2 and an impervious zone 3 under a ground surface. The invention of a method for enhancing biotransformation of groundwater contaminants comprises steps of providing an injection column 10 to the saturated zone 2 under the ground surface at an upstream of a contaminated source 12; injecting a compost solid 100 into a bottom of the injection column 10, wherein the bottom has a screen 102 for retaining the compost solid 100 in the injection column 10; contacting the compost solid 100 with a surface water (not shown in figure) added from outside to the injection column 10 to form a compost liquid and a flow of groundwater bringing the compost liquid and the groundwater contaminants of the contaminated source 12 to an downstream of the contaminated source 12; and treating the groundwater contaminants by biodegradation at the downstream of the contaminated source 12.

In the embodiment, the groundwater contaminants may be organic chlorinate organic compounds, explosive chemicals or petroleum. The above groundwater contaminants are examples but not limited thereto. The suitable carbon nitrogen ratio varies with different groundwater contaminants. For example, carbon nitrogen ratio of the compost solid is form 25:1 to 30:1 under the condition of the compost solid as organic chlorinate organic compounds or explosive chemicals. The carbon nitrogen ratio of the compost solid is form 12:1 to 20:1 under the condition of the compost solid as petroleum Besides the compost solid 100, microorganisms, carbon source, nutrient sources, oxygen, buffer materials and surfactants can be added into the injection column 100.

In the embodiment, a sampling column 14 is further provided at the downstream of the contaminated source 12 for measuring a concentration of the groundwater contaminants. The groundwater of the downstream of the contaminated source 12 becomes an effluent of the contaminated source when the concentration of the groundwater contaminants of the sampling column 14 is below a standard of environmental regulation.

Figure 2:
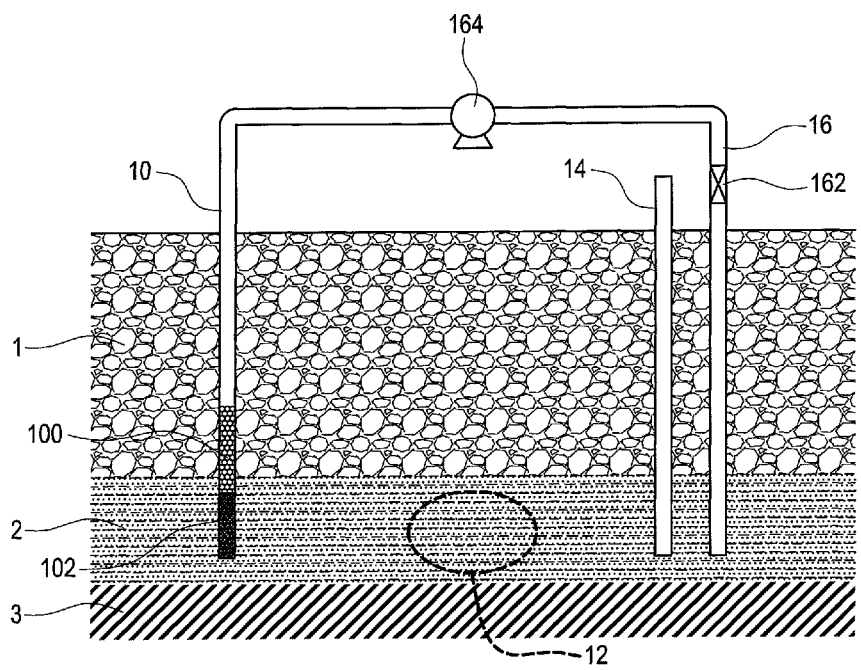
FIG. 2 shows a vertical cross section of the contaminated site with a recirculation device used in a preferred embodiment of the invention.

FIG. 2 shows a vertical cross section of the contaminated site with a recirculation device used in a preferred embodiment of the invention. As shown in FIG. 2, in the embodiment, a recirculation device 16 is provided at the downstream of the contaminated source 12. The groundwater of the downstream of the contaminated source reflows to the injection column through a pump 164 by the recirculation device 16 to contact the compost solid 100 for adsorbing and biodegrading the groundwater contaminants when the concentration of the groundwater contaminants of the sampling column 14 is beyond a standard of environmental regulation. The recirculation device 16 is filled with active carbon 162 inside to facilitate adsorption and biodegradation of the groundwater contaminants.

Figure 3:
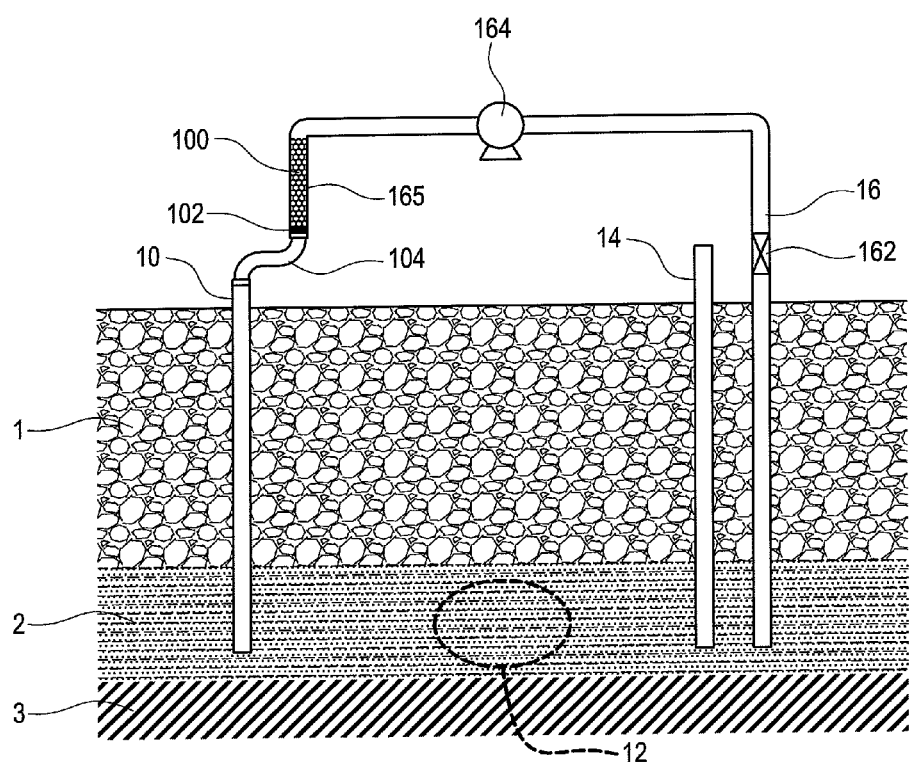
FIG. 3 shows a vertical cross section of the contaminated site with compost solid above a ground surface which is used in a preferred embodiment of the invention.

FIG. 3 shows a vertical cross section of the contaminated site with compost solid above a ground surface which is used in a preferred embodiment of the invention. As shown in FIG. 3, the invention of a method for enhancing biotransformation of groundwater contaminants comprises steps of providing an injection column 10 to the saturated zone 2 under the ground surface at an upstream of a contaminated source 12; providing a recirculation device 16 at the downstream of the contaminated source 12; filling a compost solid 100 to an outlet section 165 of the recirculation device 16, wherein the bottom of the outlet section 165 has a screen 102 for retaining the compost solid 100 in the outlet section 165; reflowing the groundwater having groundwater contaminants at the downstream of the contaminated source 12 to contact the compost solid 100 in the outlet section 165 for adsorbing and biodegrading the groundwater contaminants through a pump 164 by the recirculation device 16; providing a conduit 104 to connect the outlet section 165 of the recirculation device 16 and the injection column 10, contacting the compost solid 100 with the reflowing groundwater to form a compost liquid and a flow of groundwater bringing the compost liquid and the groundwater contaminants of the contaminated source 12 to an downstream of the contaminated source 12; and treating the groundwater contaminants by biodegradation at the downstream of the contaminated source 12.

In the embodiment, filling the compost solid 100 at the outlet section 165 of the recirculation device 16 is an example but not limited thereto. Alternatively, a pipe (not shown in figure) filled with the compost solid 100 that connects to the recirculation device 16 can instead. In the embodiment, the conduit 104 can be omitted and the pipe filled with the compost solid 100 may directly connect to the injection column 10. In the embodiment, contacting the compost solid 100 with the reflowing groundwater to form a compost liquid by the recirculation device 16 is an example but not limited thereto. Alternatively, contacting the compost solid 100 with a surface water (not shown in figure) added from outside to the injection column 10 to form a compost liquid can instead.

Figure 4:
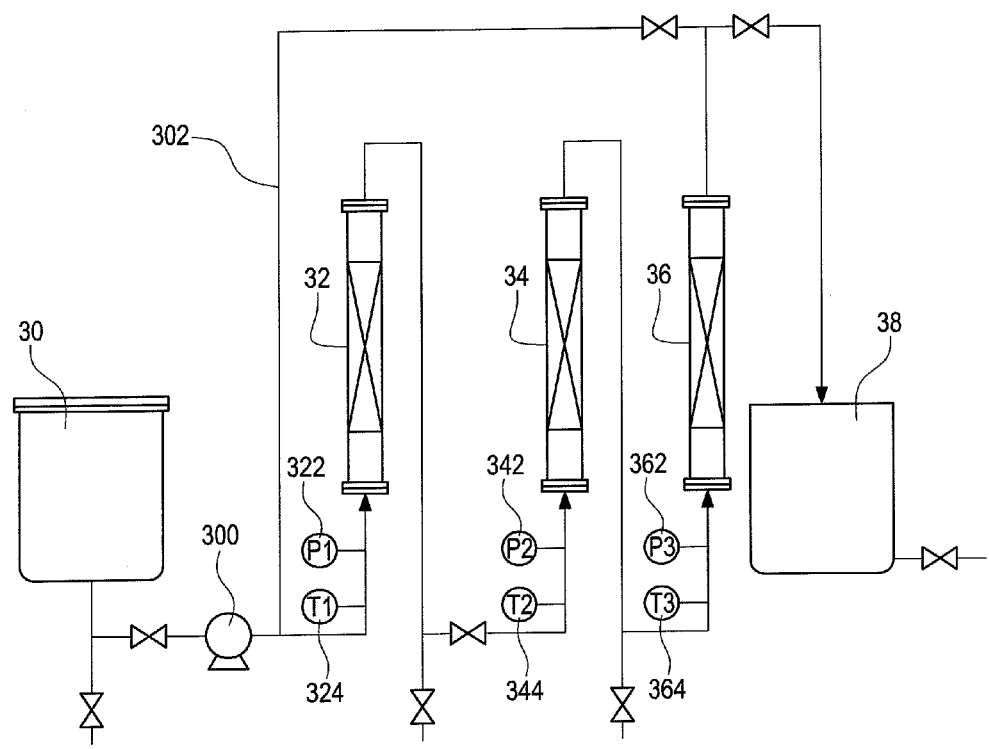
FIG. 4 schematically shows a system of column study simulating the method for enhancing biotransformation of groundwater contaminants of the invention.

FIG. 4 schematically shows a system of column study simulating the method for enhancing biotransformation of groundwater contaminants of the invention. As shown in FIG. 4, the system of column study of the invention comprises a water tank 30, a first column 32, a second column 34, a third column 36, a storage tank 38, a pump 300, a pipe 302, a pressure gauge 322, a thermometer 324, a pressure gauge 342, a thermometer 344, pressure gauge 362 and a thermometer 364, wherein water flows into the first column 32, the second column 34 and the third column 36 from water tank 30 to simulate a situation that the groundwater flows into the contaminated site and the storage tank 38 simulates a tank for storing an effluent of the contaminated source when the concentration of the groundwater contaminants of the sampling column meets a standard of environmental regulation.

In the invention, three column reactors in series are provided to conduct the column study in order to evaluate the efficiency of enhancing the biological solubility and the reductive degradation of PCE using compost liquid. The first column 32 fills with different ratio of bagasse compost/bagasse material from a first sample to a third sample: the first sample (100/0; all bagasse compost), the second sample (50/50; 50 wt % bagasse compost) and the third sample (0/100; all bagasse material), wherein the compost and/or bagasse material have (has) a total weight of 500 grams (dry weight). The second column 34 fills with 750 grams organic gardening soil and 5 liters PCE with concentration of 200 uM to simulate groundwater contaminated source. The third column 36 fills with 1000 grams uncontaminated quartz sand for inspecting the biodegradation and transportation of groundwater contaminants at the downstream of the contaminated source after compost liquid bringing PCE from the groundwater contaminated source. In the column study, sampling points are provided at an outlet of every column. Liquid samples were collected in serum bottles by a predetermined time. The concentrations of PCE and metabolized products of the liquid samples were measured and pH of liquid outflows were measured.

During the beginning of experiment, a high flowing speed of 5 mL/min is required in order to simulate groundwater fast flowing through three columns 32, 34, 36, however, it causes the concentration of PCE outflow from the third column 36 is high. Accordingly, the outflow from the third column 36 is designed to reflow to the first column 32 during the beginning of experiment. Also, the adsorption of high concentration PCE is inspected when the outflow from the third column 36 is reflowed to the first column 32. Sampling is conducted and the flowing speed is reduced to 0.5 mL/min of after 21 days. There have no PCEs can be detected at outflows from the first, second and third columns 32, 34, 36 under the first and second samples after 42 days, and thus PCE with concentration of 100 uM is added to the water tank 30 on $70^{th}$ day for PCE continuously flowing through the first, second and third columns 32, 34, 36. The removal efficiency of PCE of the first, second and third columns 32, 34, 36 under the first, second and third samples may be inspected.

The method for determining the concentrations of PCE and metabolized products of the liquid samples comprising steps of collecting liquid samples in serum bottles with covering caps to seal; drawing 0.25 ml air on the top of a serum bottle by a 0.25 ml air tight injection needle; injecting the 0.25 ml air into a GC (GC-2014, SHIMADZU) in combination with Flame Ionization Detector (FID) for determining the concentrations of PCE and metabolized products of the liquid samples.

The capillary column (SUPELCO, SPB™-624 Capillary Column) with diameter of 60 mm is used for GC and the analytical results are recorded by an integration software (SHIMADZU software). The make up gas, carrier gas and ignition gas for analysis are respectively air, high pure nitrogen and hydrogen. The operation parameters as followings: the initial temperature is 38° C., maintaining 7 minutes, raising temperature to 90° C. by 4° C. per minute, and raising temperature to 220° C. by 45° C. per minute and maintaining 3 minutes; the temperature of injection port is 250° C. and the temperature of detector is 280° C.; PCE has average retaining time of 18.1 minutes, TCE has 12.4 minutes, cis-DCE has 8.4 minutes, trans-DCE has 5.6 minutes, vinyl chloride (VC) has 4.5 minutes and ethylene (ETH) has 2.2 minutes.

Figure 5A:
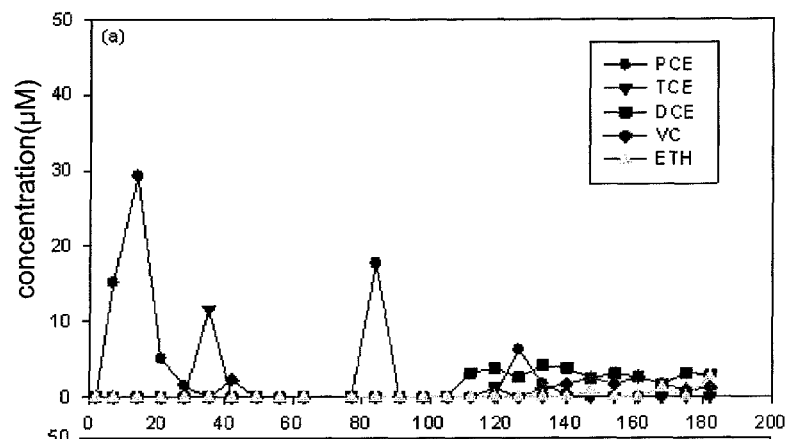
FIGS. 5A, 5B and 5C show PCE and metabolized products concentrations of the outflow of (a) the first column; (b) the second column and (c) the third column under the first sample.
Figure 5B:
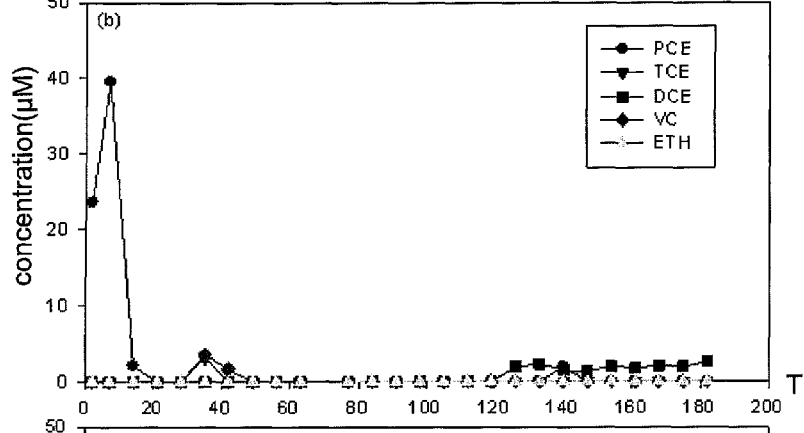
Figure 5C:
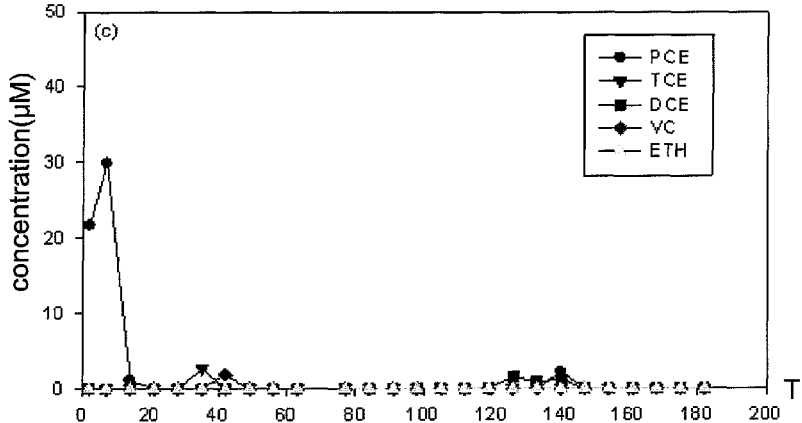
Figure 6A:
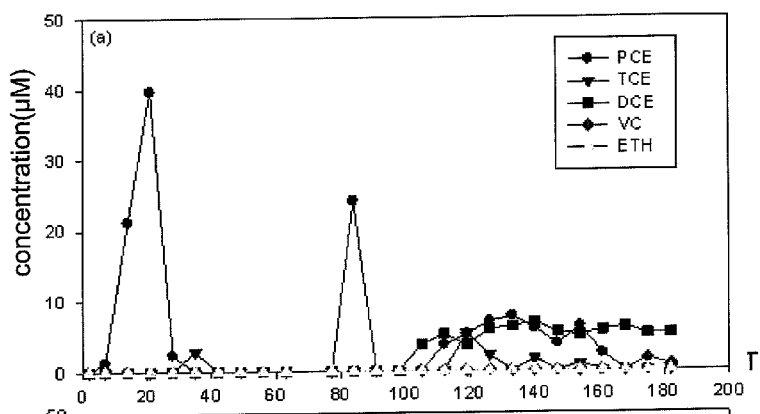
FIGS. 6A, 6B and 6C show PCE and metabolized products concentrations of the outflow of (a) the first column; (b) the second column and (c) the third column under the second sample.
Figure 6B:
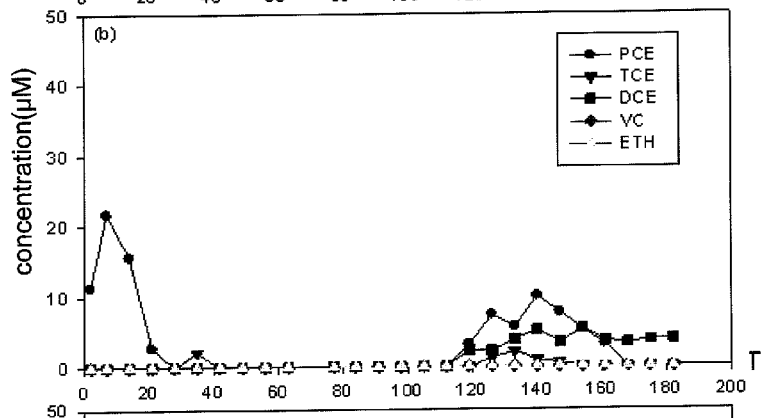
Figure 6C:
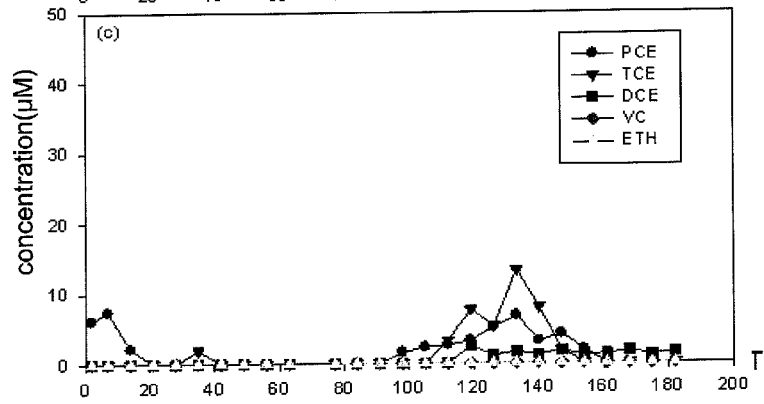
Figure 7A:
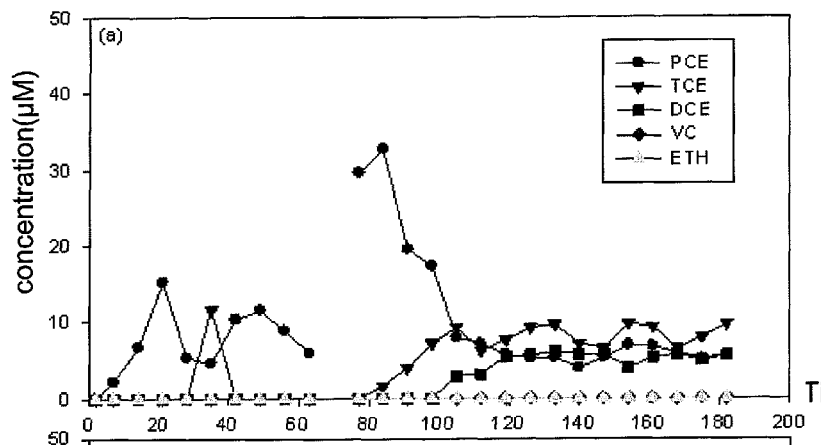
FIGS. 7A, 7B and 7C show PCE and metabolized products concentrations of the outflow of (a) the first column; (b) the second column and (c) the third column under the third sample.
Figure 7B:
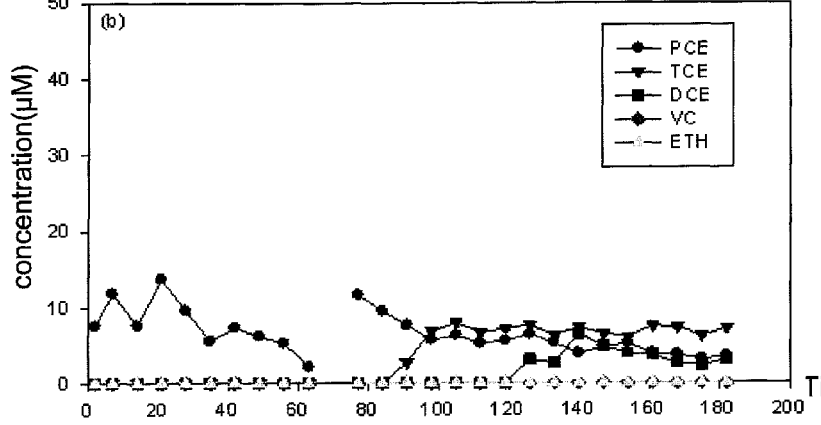
Figure 7C:
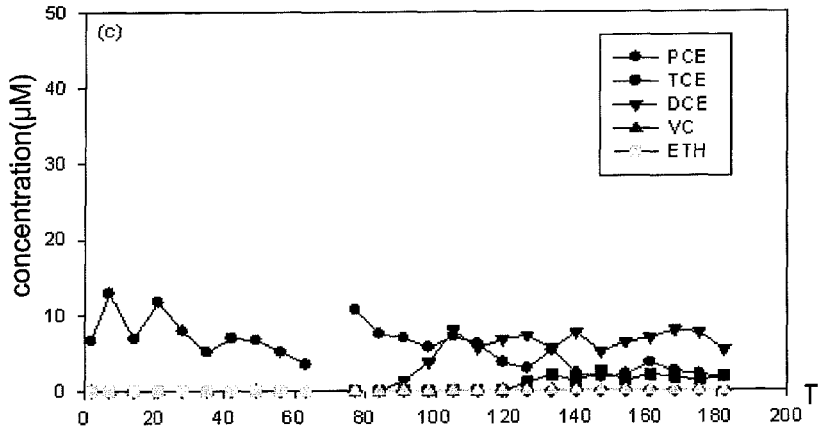

In column study of column reactors in series, PCE and metabolized products concentrations of each column outflow under the first, second and third samples are shown in FIG. 5, FIG. 6 and FIG. 7. FIGS. 5A, 5B and 5C show PCE and metabolized products concentrations of the outflow of (a) the first column; (b) the second column and (c) the third column under the first sample. FIGS. 6A, 6B and 6C show PCE and metabolized products concentrations of the outflow of (a) the first column; (b) the second column and (c) the third column under the second sample. FIGS. 7A, 7B and 7C show PCE and metabolized products concentrations of the outflow of (a) the first column; (b) the second column and (c) the third column under the third sample.

As shown in FIGS. 5 and 6, the compost liquid can fast separate PCE from the second column to reflow to the first column through the third column. On the contrary, as shown in FIG. 7, about 10 uM PCE was detected in the outflows of three columns under the third sample during the beginning of experiment. As shown in FIG. 5A, the first sample has 30 uM of PCE peak concentration in the outflow of the first column on $14^{th}$ day. Compared to the first sample, the second sample has 40 uM of PCE peak concentration in the outflow of the first column until $21^{st}$ day, as shown in FIG. 6A. The result shows the strength of surface active is relating to and in proportion to the amount of compost filled in the first column.

PCE with concentration of 100 uM is added to the water tank 30 on $70^{th}$ day for PCE continuously flowing through the first, second and third columns 32, 34, 36 under three samples. As shown in FIG. 7A, 30 uM of PCE concentration is detected in the outflow of the first column under the third sample on 77th day. On the contrary, no PCE was detected in the outflows of the first column under the first and second samples until 84th day, as shown in FIGS. 5A and 6A and the PCE concentrations reduce in proportion to compost amount increasing. The result shows the compost can absorb PCE.

As to the metabolized products of PCE in the outflow, there are only TCE and DCE in the outflow under the third sample, as shown in FIGS. 7A, 7B and 7C. On the contrary, besides TCE and DCE, VC is detected in the outflow under the first and second samples, as shown in FIGS. 5A, 5B, 5C, 6A, 6B and 6C. Even ETH is detected in the outflow of the first column under the first sample after $168^{th}$ day, as shown in FIG. 5A. Therefore, the compost solid has microorganisms that can reduce DCE to ethylene.

Figure 8:
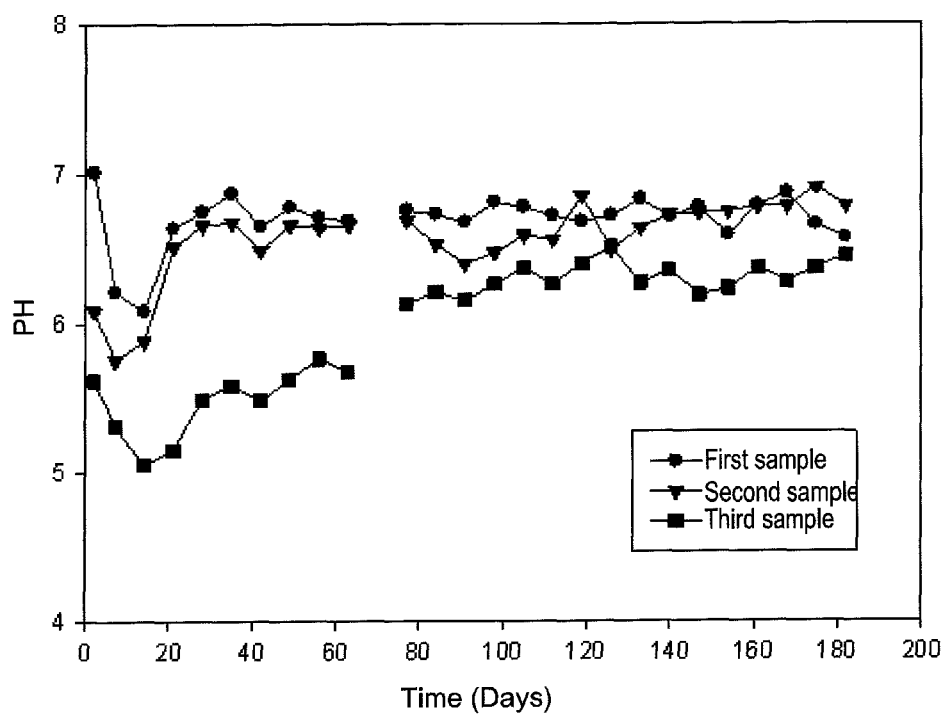
FIG. 8 shows pH of outflow liquid of the first column under three samples.

Next, please refer to FIG. 8, which shows pH of outflow liquid of the first column under three samples. The first and second samples can maintain higher pH during the beginning of experiment. Therefore, compost has excellent buffer ability.

As shown in the experimental data, compost liquid can be an excellent surfactant for separating the groundwater contaminants from the contaminated source. Also, the column filled with compost can be a biological reactive wall to adsorb and biodegrade the groundwater contaminants.

The described examples are preferred examples of the invention. However, this is not intended to limit the scope of the invention. The equivalent changes and modifications may be made in accordance with the claims of the invention without departing from the scope of the invention.

What is claimed is:

1. A method for enhancing biotransformation of groundwater contaminants comprising steps of:
   (a) providing an injection column at an upstream location of a contaminated source;
   (b) injecting a compost solid into the injection column;
   (c) contacting a liquid with the compost solid to form a compost liquid and a flow of groundwater bringing the compost liquid to a downstream location of the contaminated source and the groundwater contaminants flowing to the downstream location of the contaminated source;
   (d) treating the groundwater contaminants at the downstream location of the contaminated source; and
   (e) providing a recirculation device at the downstream location of the contaminated source for reflowing the groundwater of the downstream location of the contaminated source to the injection column.

2. The method for enhancing biotransformation of groundwater contaminants as claimed in claim 1, further comprising a sampling column at the downstream location of the contaminated source for measuring a concentration of the groundwater contaminants.

3. The method for enhancing biotransformation of groundwater contaminants as claimed in claim 2, wherein the groundwater of the downstream location of the contaminated source reflows to the injection column by the recirculation device to contact the compost solid for treating the groundwater contaminants when the concentration of the groundwater contaminants of the sampling column is beyond a standard of environmental regulation.

4. The method for enhancing biotransformation of groundwater contaminants as claimed in claim 2, wherein the groundwater of the downstream location of the contaminated source becomes an effluent of the contaminated source when the concentration of the groundwater contaminants of the sampling column is below a standard of environmental regulation.

5. The method for enhancing biotransformation of groundwater contaminants as claimed in claim 1, wherein the liquid of the step (c) is the groundwater reflowing to the injection column by the recirculation device.

6. The method for enhancing biotransformation of groundwater contaminants as claimed in claim 1, wherein the compost solid of the step (b) is provided above the ground surface and the liquid of the step (c) is a surface water added from outside to the injection column or the groundwater reflowing to the injection column by the recirculation device.

7. The method for enhancing biotransformation of groundwater contaminants as claimed in claim 1, wherein the carbon nitrogen ratio of the compost solid is form 25:1 to 30:1 under the condition of the compost solid as organic chlorinate organic compounds or explosive chemicals.

8. The method for enhancing biotransformation of groundwater contaminants as claimed in claim 1, wherein the carbon nitrogen ratio of the compost solid is form 12:1 to 20:1 under the condition of the compost solid as petroleum.

9. The method for enhancing biotransformation of groundwater contaminants as claimed in claim 1, further including an addition at least one of microorganisms, carbon source, nutrient sources, oxygen, buffer materials and surfactants to the injection column.

10. The method for enhancing biotransformation of groundwater contaminants as claimed in claim 3, wherein the recirculation device is filled with active carbon inside.

* * * * *